(12) United States Patent
Lee et al.

(10) Patent No.: US 10,214,075 B2
(45) Date of Patent: Feb. 26, 2019

(54) AIR CONDITIONER FOR VEHICLE

(71) Applicant: Hanon Systems, Daejeon (KR)

(72) Inventors: Jun Min Lee, Daejeon (KR); Seok Kim, Daejeon (KR); Young In Kim, Daejeon (KR); Yong Sik Kim, Daejeon (KR); Seung Sik Won, Daejeon (KR); Jae O Jung, Daejeon (KR); Jung Won Cho, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 15/509,280

(22) PCT Filed: Dec. 11, 2015

(86) PCT No.: PCT/KR2015/013556
§ 371 (c)(1),
(2) Date: Mar. 7, 2017

(87) PCT Pub. No.: WO2016/099078
PCT Pub. Date: Jun. 23, 2016

(65) Prior Publication Data
US 2017/0282682 A1 Oct. 5, 2017

(30) Foreign Application Priority Data

Dec. 17, 2014 (KR) .................. 10-2014-0182326
Dec. 19, 2014 (KR) .................. 10-2014-0184642

(51) Int. Cl.
*B60H 1/00* (2006.01)
*B60H 1/12* (2006.01)
(Continued)

(52) U.S. Cl.
CPC .......... *B60H 1/00685* (2013.01); *B60H 1/00* (2013.01); *B60H 1/00521* (2013.01);
(Continued)

(58) Field of Classification Search
CPC .......... B60H 1/00685; B60H 1/00521; B60H 1/00664; B60H 2001/007; B60H 1/00457;
(Continued)

(56) References Cited

U.S. PATENT DOCUMENTS 7,088,584 B2 * 8/2006 Chen .................. H01L 23/467
257/E23.099
2006/0068694 A1 * 3/2006 Tajiri ................. B60H 1/00685
454/152

(Continued)

FOREIGN PATENT DOCUMENTS

KR 20060118726 A 11/2006
KR 20070005249 A 1/2007
(Continued)

*Primary Examiner* — Steven B McAllister
*Assistant Examiner* — Ko-Wei Lin
(74) *Attorney, Agent, or Firm* — Norton Rose Fulbright US LLP

(57) ABSTRACT

Disclosed is an air conditioner for a vehicle which has inside air intake ports formed on the side surface of a cylindrical intake duct and the side surface of a cylindrical intake door so as to partially inhale inside air during an outside air inflow mode, thereby reducing manufacturing processes and manufacturing costs because there is no need to add a separate component for inhaling inside air in the outside air inflow mode, controlling intake amounts of outside air and inside air through a recess part formed on the outer circumferential surface of the intake door, and enhancing cooling and heating performance by partially inhaling inside air during the outside air inflow mode.

17 Claims, 13 Drawing Sheets

(51) Int. Cl.
*B60H 1/26* (2006.01)
*B60H 1/32* (2006.01)

(52) U.S. Cl.
CPC ........... *B60H 1/00849* (2013.01); *B60H 1/12* (2013.01); *B60H 1/26* (2013.01); *B60H 1/32* (2013.01); *B60H 2001/007* (2013.01)

(58) Field of Classification Search
CPC ............ B60H 1/00464; B60H 1/00471; B60H 1/247; B60H 1/24; B60H 1/00; B60H 3/00
USPC .................................. 454/139–142, 69, 152
See application file for complete search history.

(56) References Cited

U.S. PATENT DOCUMENTS

2006/0254295 A1\* 11/2006 Kim ................... B60H 1/00685
62/239
2012/0034859 A1\* 2/2012 Meehan ............. B60H 1/00685
454/152

FOREIGN PATENT DOCUMENTS

| KR | 20110065138 A | | 6/2011 |
|----|---------------|---|--------|
| KR | 20110073816 A | \* | 6/2011 |
| KR | 20110087084 A | \* | 8/2011 |

\* cited by examiner

PRIOR ART

PRIOR ART

PRIOR ART

AIR CONDITIONER FOR VEHICLE

This application is a § 371of International Application No. PCT/KR2015/013556 filed on Dec. 11, 2015 and claims priority from Korean Patent Application Nos. 10-2014-0182326filed on Dec. 17, 2014 and 10-2014-0184642 filed on Dec. 19, 2014.

TECHNICAL FIELD

The present invention relates to an air conditioner for a vehicle, and more particularly, to an air conditioner for a vehicle which has inside air intake ports formed on the side surface of a cylindrical intake duct and the side surface of a cylindrical intake door so as to partially inhale inside air during an outside air inflow mode.

BACKGROUND ART

An air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

According to independent structures of a blower unit, an evaporator unit and a heater core unit, such an air conditioner is classified into a three-piece type air conditioner in which the blower unit, the evaporator unit and the heater core unit are disposed independently, a semi-center type air conditioner in which the evaporator unit and the heater core unit are embedded in the air-conditioning case and the blower unit is mounted separately, and a center-mounting type air conditioner in which the three units are all embedded in the air-conditioning case.

In order to increase effectiveness of the interior space of a vehicle, compact-sized and miniaturized air conditioners for vehicles are being demanded. In response to such demand, recently, development of a center-mounting type air conditioner in which a blower unit, an evaporator unit and a heater core unit are integrated is being promoted. As an example, such a center-mounting type air conditioner for a vehicle is illustrated in FIGS. 1 and 2.

The center-mounting type air conditioner 1 illustrated in FIGS. 1 and 2 includes: an air-conditioning case 10 in which a blower 20 is mounted at an inlet and a plurality of air outflow ports 12a to 12e formed at an outlet thereof; an evaporator 2 and a heater core 3 embedded in the air-conditioning case 10; one or more temperature-adjusting doors 14 for adjusting the degree of opening of a cold air passageway P1 and a warm air passageway P2 inside the air-conditioning case 10; and a plurality of mode doors 13 for adjusting the degree of opening of the air outflow ports 12a to 12e.

Moreover, the blower 20 includes: a scroll case 21 disposed at the inlet of the air-conditioning case 10; a centrifugal fan 25 rotatably mounted inside the scroll case 21; an intake duct 30 which is mounted at one side of the scroll case 21 and has inside and outside air inflow ports 31 and 32, which are opened and closed by an intake door 33; an inlet ring 22 which is formed at one side of the scroll case 21 facing the intake duct 30 to guide the air induced through the inside and outside air inflow ports 31 and 32 toward the inside of the centrifugal fan 25; and a motor 27 mounted on the opposite side of the inlet ring 22 of the scroll case 21 to operate the centrifugal fan 25.

The intake door 33 opens the inside air inflow port 31 in the inside air inflow mode so that only inside air flows in but opens the outside air inflow port 32 in the outside air inflow mode so that only outside air flows in.

Moreover, an air filter 35 for removing foreign matters contained in the air is mounted inside the intake duct 30.

In the meantime, the intake door 33 is configured as a flat type door, and in this instance, a rotary shaft of the intake door 33 is arranged to be at right angles to a rotary shaft of the centrifugal fan 25.

Therefore, when the centrifugal fan 25 of the blower 20 is operated, low pressure is formed inside the centrifugal fan 25 by rotation of the centrifugal fan 25 so that air is inhaled in the axial direction of the centrifugal fan 25 through the inlet ring 22 and is blown in the radial direction of the centrifugal fan 25, and then, the blown air is discharged to the inside of the air-conditioning case 10 through an outlet 23 of the scroll case 21.

Continuously, the air discharged to the inside of the air-conditioning case 10 is cooled while passing through the evaporator 2, and then, bypasses the heater core 3 by the temperature-adjusting door 14 to flow in a cold air state or passes the heater core 3 to be converted into warm air through heat-exchange. After that, the air is discharged to the interior of the vehicle through the air outflow ports 12 opened according to the air-conditioning modes so as to cool or heat the interior of the vehicle.

However, the conventional blower 20 has a disadvantage in that it requires lots of driving power to raise heating performance when a heater is operated in cold weather, such as winter season. That is, in cold weather such as winter season, the air conditioner is generally set as the outside air inflow mode not only to maintain the interior of the vehicle in a heated state but also to prevent frost on windows. Therefore, the conventional air conditioner requires lots of driving power to heat the interior of the vehicle and is deteriorated in heating performance because only cold air outside the vehicle is introduced through the outside air inflow port 32.

In order to solve the above problems, as shown in FIG. 3, the intake door 33 has an inside air inflow structure to raise heating performance by partially introducing inside air in the outside air inflow mode. Referring to FIG. 3, the intake door 33 includes an auxiliary inside air passageway 33a, a rotary shaft 33b and an auxiliary door 34 mounted on the rotary shaft 33b of the intake door 33 for opening and closing the auxiliary inside air passageway 33a.

Therefore, the auxiliary door 34 closes the auxiliary inside air passageway 33a in the inside air inflow mode, and opens the auxiliary inside air passageway 33a by negative pressure generated by operation of the centrifugal fan 25 in the outside air inflow mode. Therefore, when the heater is operated in the outside air inflow mode, outside air introduced through the outside air inflow port 32 and inside air introduced through the auxiliary inside air passageway 33a are mixed together, and then, the mixed air is introduced into the air-conditioning case 10 so as to reduce driving power required for heating and raise heating performance.

However, the conventional air conditioner for the vehicle has a disadvantage in that manufacturing processes and manufacturing costs are increased due to an increase of the number of components because it requires additional components, such as the auxiliary door 34 additionally mounted on the intake door 33 to inhale inside air in the outside air inflow mode.

DISCLOSURE

Technical Problem

Accordingly, the present invention has been made in an effort to solve the above-mentioned problems occurring in the prior arts, and it is an object of the present invention to provide an air conditioner for a vehicle which has inside air intake ports formed on the side surface of a cylindrical intake duct and the side surface of a cylindrical intake door so as to partially inhale inside air during an outside air inflow mode, thereby reducing manufacturing processes and manufacturing costs because there is no need to add a separate component for inhaling inside air in the outside air inflow mode, controlling intake amounts of outside air and inside air through a recess part formed on the outer circumferential surface of the intake door, and enhancing cooling and heating performance by partially inhaling inside air during the outside air inflow mode.

Technical Solution

To achieve the above objects, the present invention provides an air conditioner for a vehicle including: a scroll case which is disposed at an inlet of an air-conditioning case and has a centrifugal fan mounted therein; an intake duct which is combined to one side of the scroll case in an axial direction of the centrifugal fan and has inside and outside air inflow ports to introduce inside air and outside air; and an intake door which is rotatably mounted inside the intake duct through a rotary shaft to open and close the inside and outside air inflow ports, wherein the intake duct has an opening formed at one side to be combined to the scroll case and the inside and outside air inflow ports are formed in the outer circumferential surface of the intake duct to be spaced apart from each other in the circumferential direction, the intake door has an opening formed in a cylindrical door part to open and close the inside and outside air inflow ports according to rotational angles, and in an outside air inflow mode where the outside air inflow port is opened by the intake door, inside air intake holes are respectively formed in the side of the intake duct and the side of the intake door so that inside air existing outside the intake duct is inhaled into the intake door.

Advantageous Effects

As described above, the air conditioner for the vehicle according to the present invention can reduce manufacturing processes and manufacturing costs without needing any separate component for inhaling inside air in the outside air inflow mode, because the inside air intake ports are formed on the side surface of the cylindrical intake duct and the side surface of the cylindrical intake door in order to partially take in inside air during the outside air inflow mode.

Moreover, the air conditioner for the vehicle according to the present invention can enhance cooling and heating performance by partially inhaling inside air during the outside air inflow mode.

Furthermore, the air conditioner for the vehicle according to the present invention can control the intake amounts of outside air and inside and maximize cooling and heating performance because the recess part is formed on the outer circumferential surface of the intake door.

Additionally, the air conditioner for the vehicle according to the present invention can prevent misassembly between the intake door 150 and the intake duct 140 and improve assemblability by easily finding the correct position of the intake door because of the support rib for fixing and supporting the rotary shaft of the cylindrical intake door and the misassembly preventing means formed on the supporter, which is formed on the inner circumferential surface of the intake duct to rotatably support the rotary shaft of the intake door.

In addition, the air conditioner for the vehicle according to the present invention can improve bearing strength of the supporter by the shielding plate of the misassembly preventing means and prevent that the intake door is separated from the operational range by operating power or air volume of the actuator because the stud of the intake door is caught to the supporter within the operational range.

MODE FOR INVENTION

Figure 1:
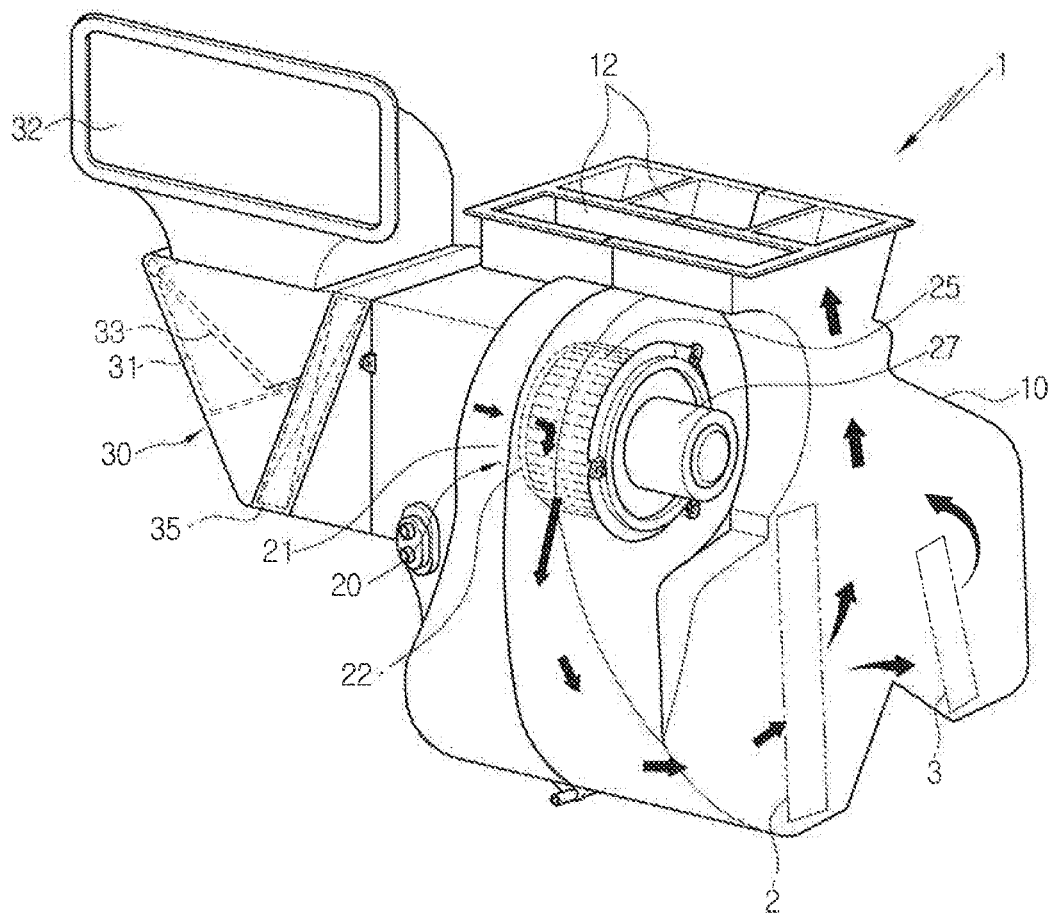
FIG. 1 is a perspective view showing a conventional air conditioner for a vehicle.
Figure 2:
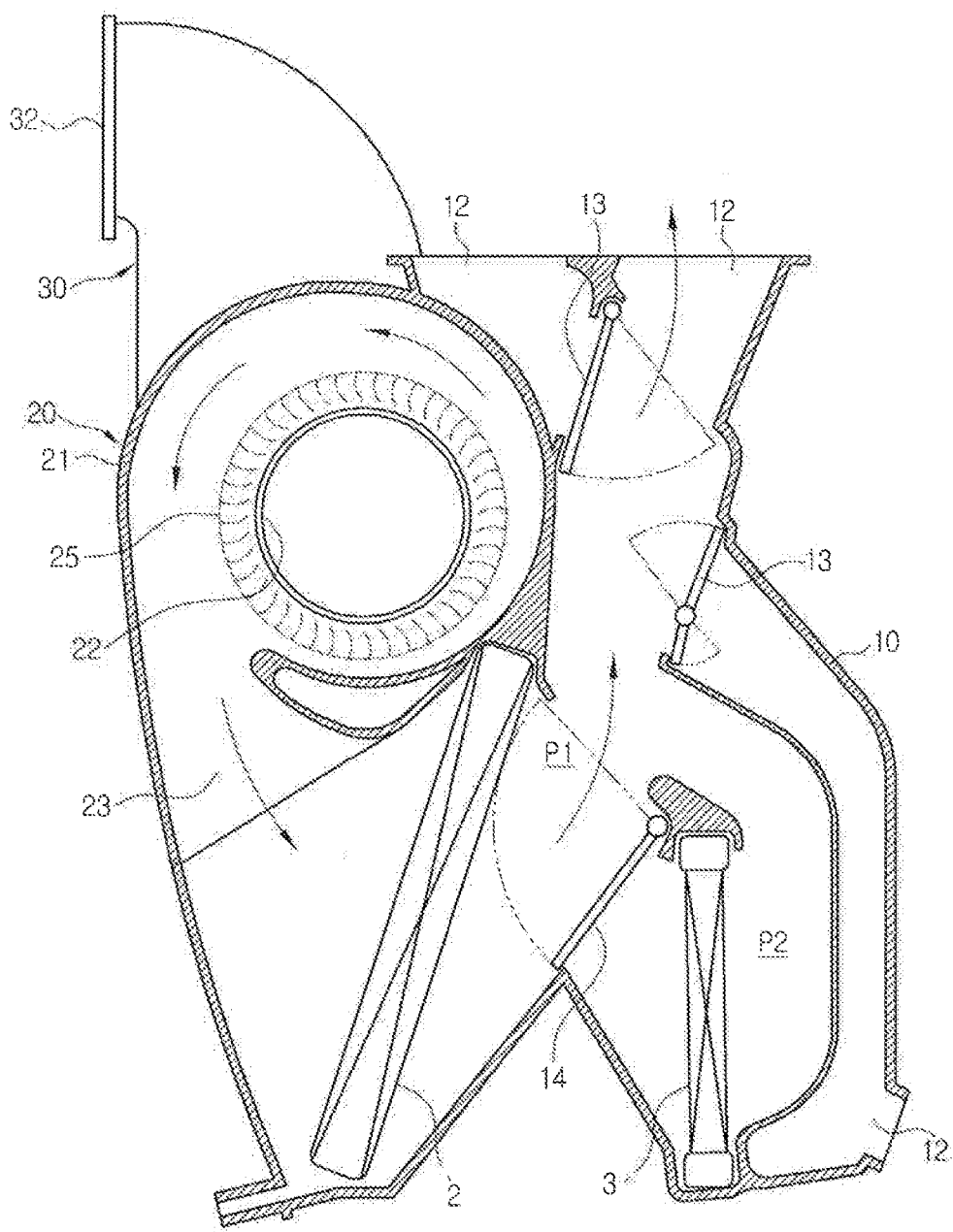
FIG. 2 is a sectional view of FIG. 1.
Figure 3:
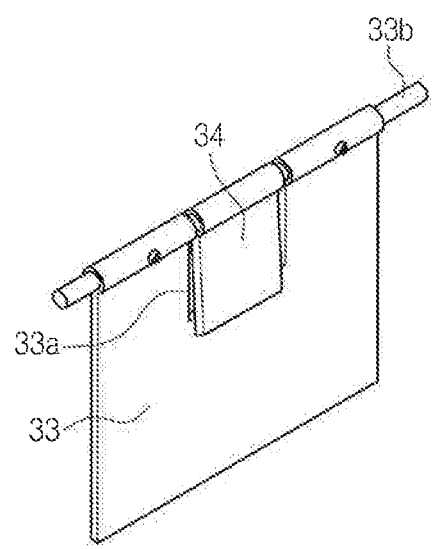
FIG. 3 is a perspective view showing a state where an inside air inflow structure is mounted on an intake door in the conventional air conditioner for the vehicle.
Figure 4:
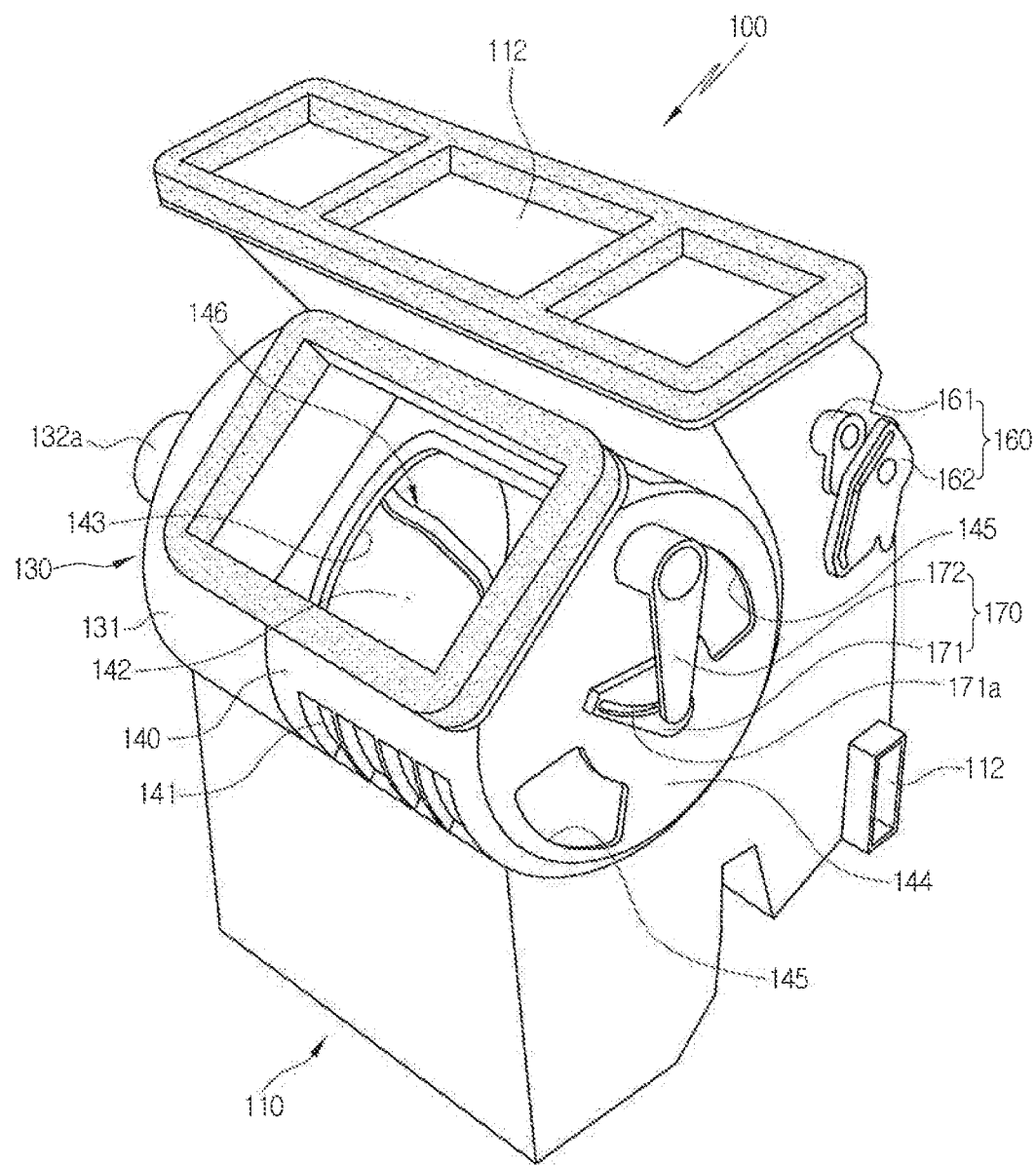
FIG. 4 is a perspective view of an air conditioner for a vehicle according to the present invention.
Figure 5:
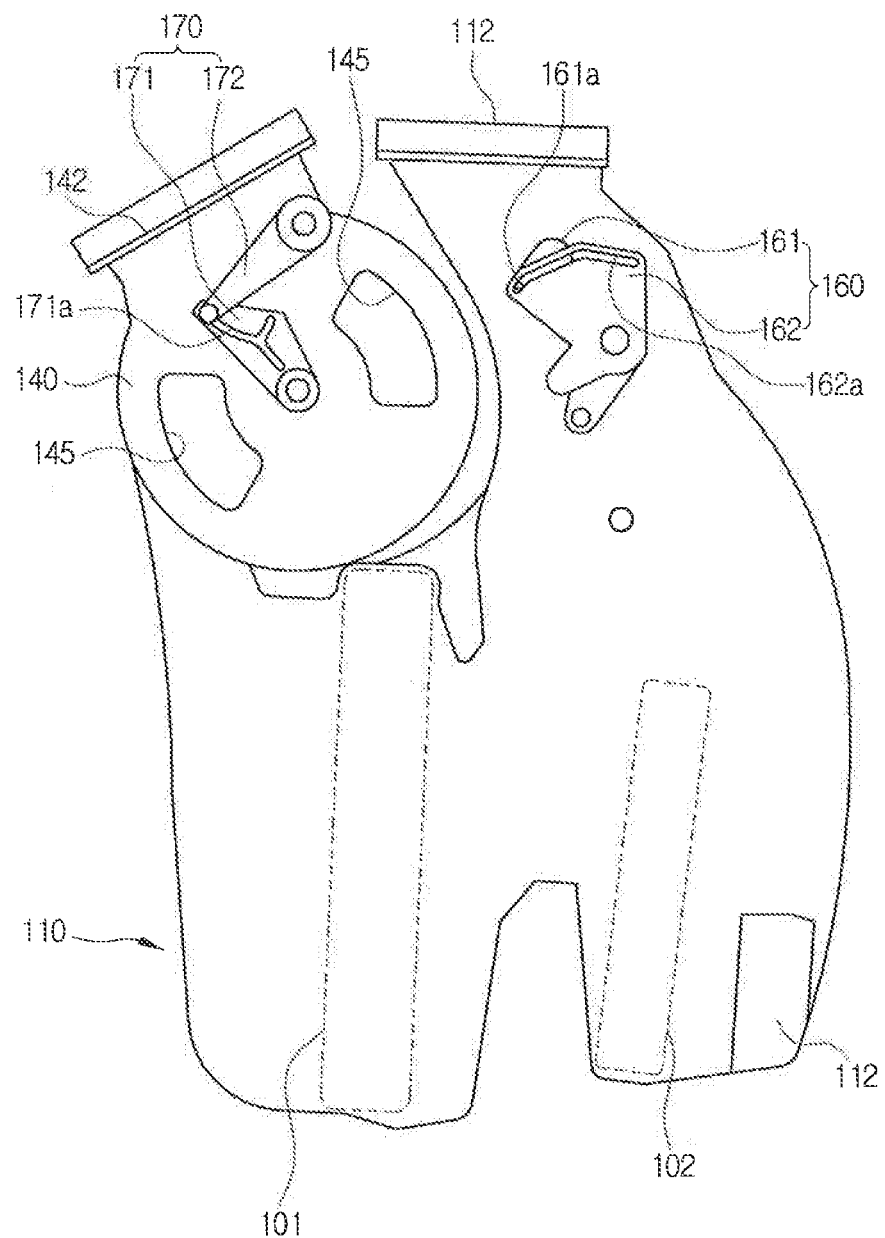
FIG. 5 is a side view of the air conditioner for the vehicle according to the present invention.

Hereinafter, reference will be now made in detail to the preferred embodiments of the present invention with reference to the attached drawings.

As shown in the drawing, an air conditioner 100 for a vehicle according to a preferred embodiment of the present invention includes: an air-conditioning case 110; a blower 130 disposed at an inlet 111 of the air-conditioning case 110; and an evaporator 101 and a heater core 102 mounted in an inside air passageway of the air-conditioning case 110.

The inlet 111 of the air-conditioning case 110 is connected with an outflow port 133 of the blower 130, and a plurality of outlets 112 are formed to discharge air to parts of the interior of the vehicle.

The number or the positions of the outlets 112 are varied according to kinds of vehicles.

Moreover, mode doors 125 are respectively mounted at the outlets 112 of the air-conditioning case 110 to adjust the degree of opening of the outlets 112 according to an air outflow mode.

Furthermore, the evaporator 101 and the heater core 102 are formed between the inlet 111 and the outlets 112 of the air-conditioning case 110 to be spaced apart from each other at a predetermined interval.

Additionally, a temperature-adjusting door 120 is mounted between the evaporator 101 and the heater core 102 inside the air-conditioning case 110.

The temperature-adjusting door 120 adjusts the degrees of opening of a passageway bypassing the heater core 102 and a passageway passing the heater core 102 to control a mixed amount of cold air bypassing the heater core 102 and warm air passing the heater core 102 after passing through the evaporator 101 in order to adjust temperature.

In the meantime, the temperature-adjusting door 120 and the mode door 125 are operated by operating means 160.

Now, as an example, the operating means 160 for operating the mode door 125 will be described. The operating means 160 includes: an arm 161 which is combined with a rotary shaft of the mode door 125 and has a pin 161a at an end portion; and a cam 162 rotatably combined to the outer face of the air-conditioning case 110 and has a slot 162a for allowing the pin 161a of the arm 161 to be slidably combined.

Therefore, when the cam 162 rotates at a predetermined angle, the arm 161 operates the mode door 125 while providing a cam motion along the shape of the slot 162a.

The cam 162 is operated by an actuator (not shown) or a wire (not shown).

The operating means for operating the temperature-adjusting door 120 is the same as that of the mode door 125.

In addition, the blower 130 includes: a scroll case 131 connected and disposed at the inlet 111 of the air-conditioning case 110; a centrifugal fan 132 rotatably mounted inside the scroll case 131; an intake duct 140 which is combined to one side of the scroll case 131 in an axial direction of the centrifugal fan 132 and has inside and outside air inflow ports 141 and 142 to introduce inside air and outside air; and an intake door 150 which is rotatably mounted inside the intake duct 140 to open and close the inside and outside air inflow ports 141 and 142.

Such a blower 130 is mounted above the evaporator 101 of the air-conditioning case 110, and the scroll case 131 is formed integrally with the air-conditioning case 110.

Additionally, the intake duct 140 is combined to one side of the scroll case 131 and a motor 132a for operating the centrifugal fan 132 is combined to the other side of the scroll case 131.

Moreover, the intake duct 140 is formed in a cylindrical shape. One side of the cylindrical intake duct 140 in the axial direction is opened by a round opening 143, and the other side 144 is closed. Of course, the closed side 144 of the intake duct 140 has an air intake hole 145 which will be described later.

Furthermore, the opening 143 of the intake duct 140 is combined to the scroll case 131.

Additionally, the inside and outside air inflow ports 141 and 142 are formed on the outer circumferential surface of the intake duct 140 to be spaced apart from each other in the circumferential direction.

A pair of the inside air inflow ports 141 are formed on the outer circumferential surface of the intake duct 140 corresponding to positions of a pair of door plates 153a and 153b. Namely, two inside air inflow ports 141 are formed at an interval of 180 degrees.

One outside air inflow port 142 is formed on the outer circumferential surface of the intake duct 140, and in this instance, the outside air inflow port 142 is formed between a pair of the inside air inflow ports 141 on the outer circumferential surface of the intake duct 140.

In other words, the two inside air inflow ports 141 are formed in the direction of 180 degrees in the middle of the intake duct 140 and the one outside air inflow port 142 is formed in the direction of 90 degrees.

Therefore, when the centrifugal fan 132 of the blower 130 is operated, air is inhaled into the intake duct 140 through the inside and outside air inflow ports 141 and 142, and the inhaled air is discharged in the radial direction of the centrifugal fan 132 after being introduced into the centrifugal fan 132. After that, the air is supplied to the inlet 111 of the air-conditioning case 110 through the outflow port 133 of the blower 130.

In addition, a supporter 146 for rotatably supporting a rotary shaft 151a of the intake door 150 is disposed on the inner circumferential surface of the opening 143 of the intake duct 140.

Accordingly, the rotary shaft 151a of the intake door 150 is rotatably combined to the supporter 146, and a rotary shaft 151b of the other side is rotatably combined to the closed side 144 of the intake duct 140.

The supporter 146 includes: a boss part 146a for rotatably supporting the rotary shaft 151a of the intake door 150; and a plurality of connection ribs 146b for connecting the outer circumferential surface of the boss part 146a with the inner circumferential surface of the opening 143 of the intake duct 140.

Three plural connection ribs 146b are formed at an interval of 120 degrees, and in this instance, the boss part 146a is arranged to be spaced apart from the opening 143 of the intake duct 140 at a predetermined interval by the connection rib 146b.

Moreover, the intake door 150 is rotatably mounted inside the intake duct 140 and the rotary shafts 151a and 151b of the intake door 150 are mounted to be in the same direction with the rotary shaft of the centrifugal fan 132 so as to open and close the inside and outside air inflow ports 141 and 142.

The intake door 150 is a cylindrical door, and has an opening 154 formed on the outer circumferential surface of the cylindrical door part 153 to open and close the inside and outside air inflow ports 141 and 142 according to rotating angles.

In more detail, the intake door 150 includes: a pair of door plates 153a and 153b which are spaced apart from each other at a predetermined interval in the radial direction based on the rotary shafts 151a and 151b thereof to form the cylindrical door part 153; a support rib 152 which connects inner faces of the door plates 153a and 153b with each other and on which the rotary shaft 151a is formed; and a side plate 156 which connects end portions of the door plates 153a and 153b with each other and on which the other rotary shaft 151b is formed.

The support rib 152 formed on the inner circumferential surface of the cylindrical door part 153 fixes and supports the rotary shaft 151a of one side.

Each of the door plates 153a and 153b is formed in an arc shape.

Furthermore, the support rib 152 includes: a 'V'-shaped first rib 152a formed on the inner face of the door plates 153a and connected toward the rotary shaft 151a; and a 'V'-shaped second rib 152b formed on the inner face of the other door plate 153b and connected toward the rotary shaft 151a. The rotary shaft 151a axially protrudes at the portion where the first rib 152a and the second rib 152b meet together.

Additionally, the intake door 150 has the opening 154 formed between the door plates 153a and 153b in the circumferential direction.

Meanwhile, one end portion of each of the door plates 153a and 153b is supported by the side plate 156 to be connected, and the other end portion is supported by a reinforcing bar 158 to be connected.

In this instance, the reinforcing bar 158 is formed at the position spaced apart from the other end portion of the door plate at a predetermined interval.

Therefore, in the outside air inflow mode, the door plates 153a and 153b close the inside air inflow port 141 and the opening 154 opens the outside air inflow port 142 to make the outside air flow in. In an inside air inflow mode, one of the door plates 153a and 153b closes the outside air inflow port 142 and the opening 154 opens the inside air inflow port 141 to make the inside air flow in.

Figure 6:
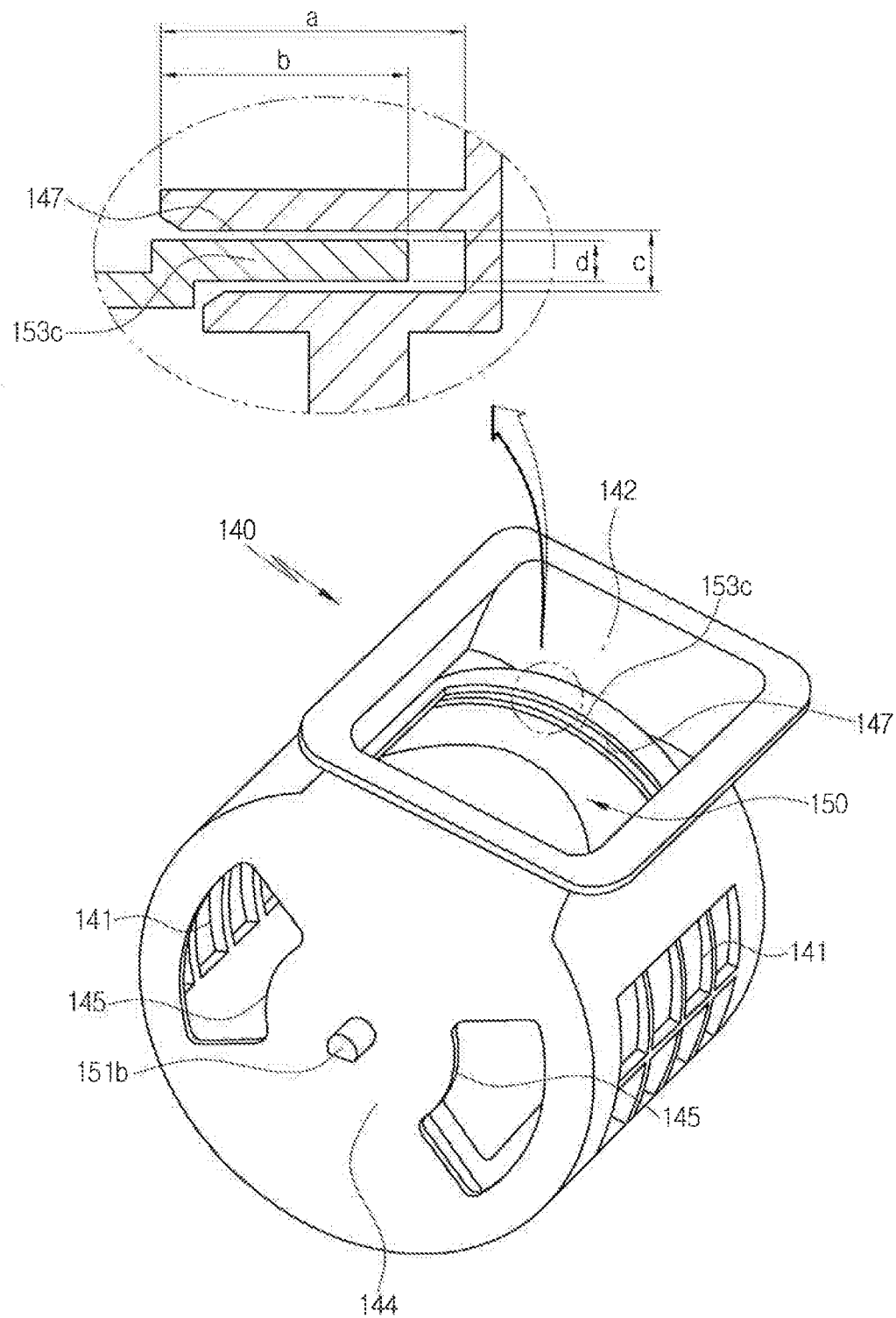
FIG. 6 is a perspective view of an intake duct of the air conditioner for the vehicle according to the present invention.
Figure 7:
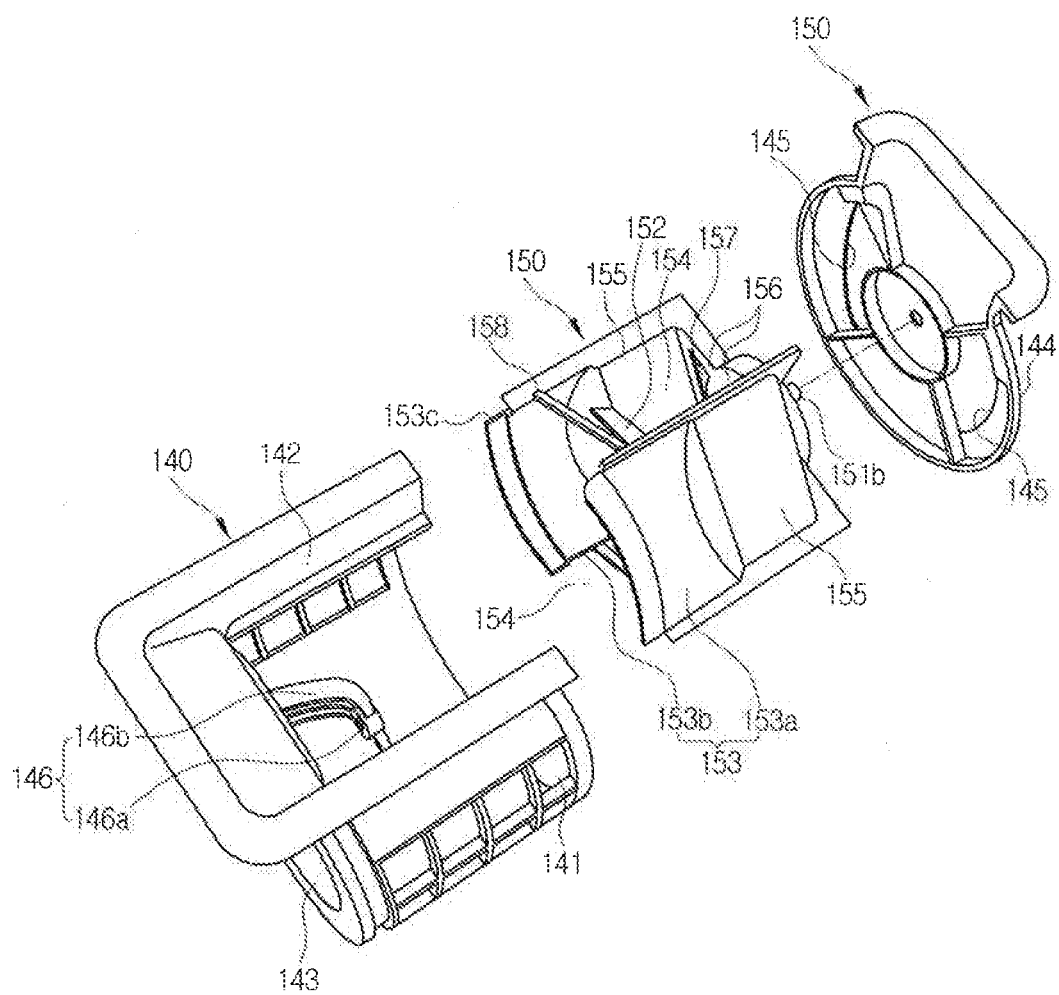
FIG. 7 is an exploded perspective view of the intake duct and an intake door of the air conditioner for the vehicle according to the present invention.
Figure 8:
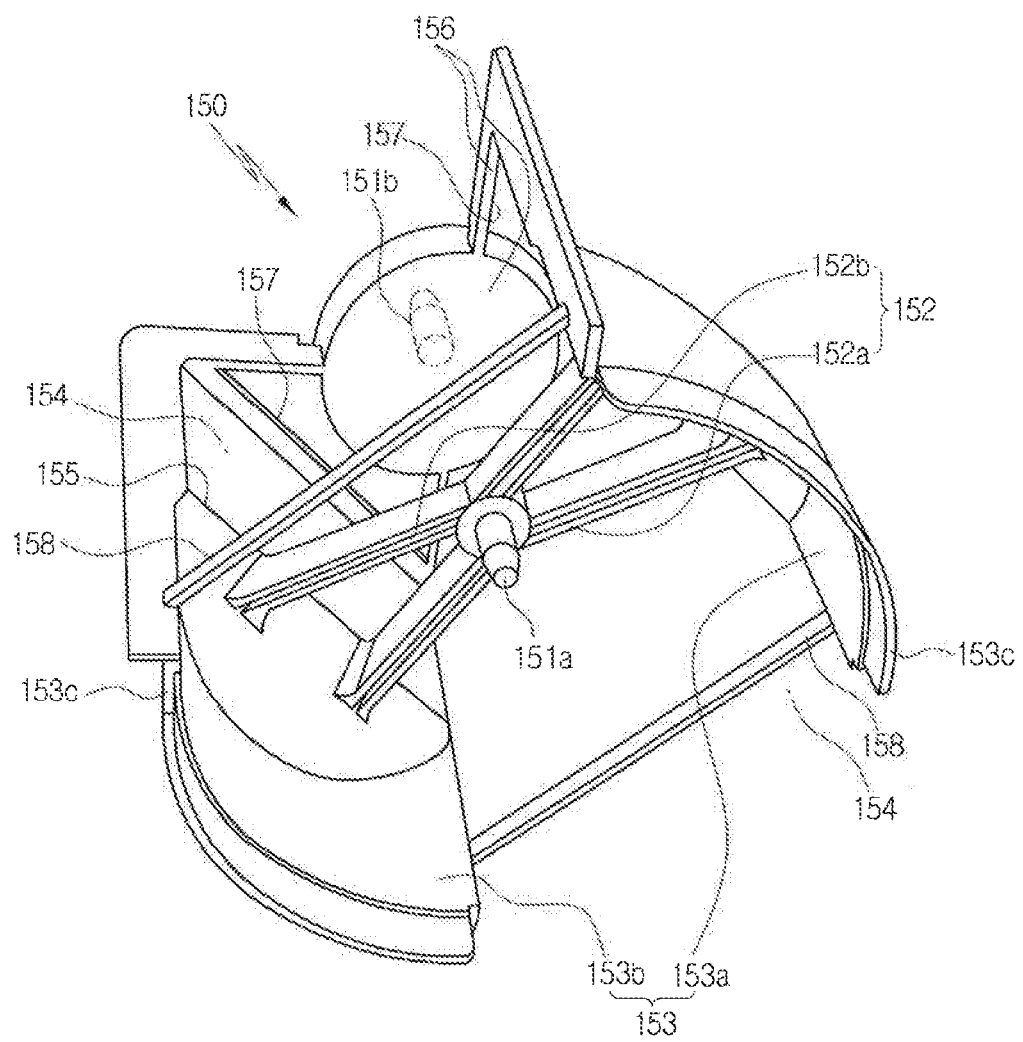
FIG. 8 is a perspective view of the intake door of the air conditioner for the vehicle according to the present invention.
Figure 9:
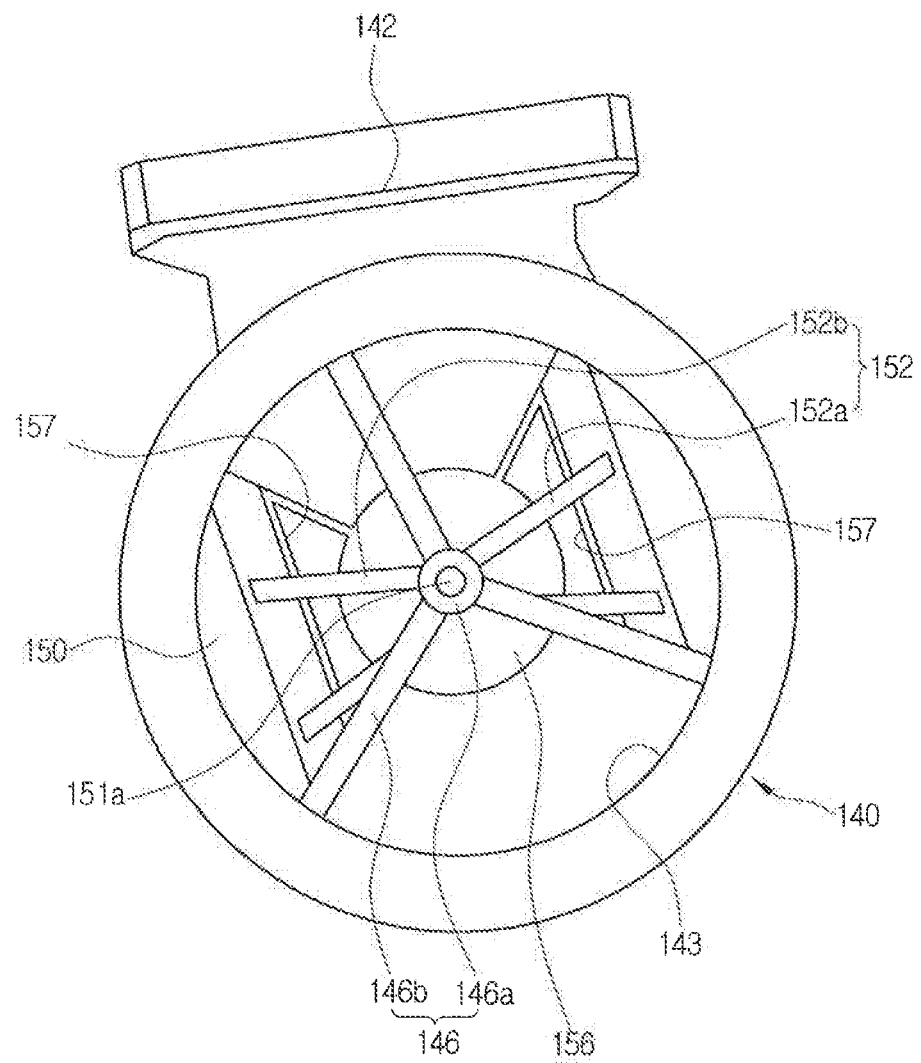
FIG. 9 is a side view seen from an opening of the intake duct of FIG. 7.

As shown in FIG. 6, the intake duct 140 includes: an insertion groove 147 formed on the circumference of the opening 143 thereof; and a support protrusion 153c formed on the other end portions of the door plates 153a and 153b and rotatably inserted into the insertion groove 147 to be supported.

That is, end portions of the door plates 153a and 153b are connected with each other by the side plate 156 to be closed, but the other end portions of the door plates 153a and 153b are not connected with each other and are opened for a flow of air. Therefore, in case that the door plates 153a and 153b close the inside air inflow port 141 or the outside air inflow port 142, air may leak through the other end portions of the door plates 153a and 153b, but the support protrusion 153c formed on the other end portions of the door plates 153a and 153b is inserted into the insertion groove 147 formed on the circumference of the opening 143 of the intake duct 140 to prevent air leakage.

In this instance, if the interval between the insertion groove 147 and the support protrusion 153c is reduced in order to prevent air leakage, operating power to operate the intake door 150 increases and it makes manipulation power bad. On the contrary, if the interval between the insertion groove 147 and the support protrusion 153c is widened to reduce operating power of the intake door 150, excessive air leakage is generated to reduce heating and cooling performance.

Therefore, if the depth of the insertion groove 147 is "a" and the length of the support protrusion 153c inserted into the insertion groove 147 is "b", a ratio of b/a satisfies 0.6 to 0.8.

If the width of the insertion groove 147 is "c" and the thickness of the support protrusion 153c inserted into the insertion groove 147 is "d", a ratio of d/c satisfies 0.65 to 0.75.

In this instance, it is preferable that the ratio of b/a be 0.72 and the ratio of d/c be 0.70.

As described above, if the depth and the width of the insertion groove 147 and the length and the thickness of the support protrusion 153c are optimized, degradation of heating and cooling performance due to air leakage is minimized and manipulation power for controlling the intake door 150 by a controller becomes better owing to a decrease of operating power for operating the intake door 150, so that the intake door 150 can be manipulated smoothly.

In addition, in the outside air inflow mode that the outside air inflow port 142 is opened by the intake door 150, inside air intake holes 145 and 157 are formed in the side 144 of the intake duct 140 and the side 156 of the intake door 150 so that inside air existing outside the intake duct 140 can be inhaled into the intake door 150.

The inside air intake hole 157 of the intake door 150 is formed to penetrate through the intake door 150.

The inside air intake hole 145 of the intake duct 140 is formed to penetrate through the side 144 of the intake duct 140 facing the side plate 156 of the intake door 150.

In this instance, two inside air intake holes 145 of the intake duct 140 are formed at 180 degrees based on the rotary shaft 151b of the intake door 150, and preferably, are formed corresponding to a pair of the inside air inflow ports 141.

In the meantime, the inside air intake holes 157 formed on the side plate 156 of the intake door 150 may be respectively formed in both side plates 156 based on the rotary shaft 151b or may be formed just in one side plate 156.

Therefore, in the outside air inflow mode, because the opening 154 of the intake door 150 opens the outside air inflow port 142 and the door plates 153a and 153b close the inside air inflow port 141, the side plate 156 which connects the door plates 153a and 153b with each other is located at the position where the inside air intake hole 145 of the intake duct 140 is closed. In this instance, while the inside air intake hole 157 formed in the side plate 156 and the inside air intake hole 145 formed in the side 144 of the intake duct 140 coincide with each other, the inside air intake holes 145 and 157 are opened, so that the inside air of a predetermined amount is inhaled through the inside air intake holes 145 and 157 even in the outside air inflow mode.

Meanwhile, in the outside air inflow mode, the inside air intake hole 157 formed in the side plate 156 and the inside air intake hole 145 formed in the side 144 of the intake duct 140 are opened while coinciding with each other, and in the inside air inflow mode, the inside air intake hole 145 is opened while the side plate 156 of the intake door 150 deviates from the inside air intake hole 145 of the intake duct 140.

Moreover, a recess part 155 is formed on the cylindrical door part 153 of the intake door 150 to be inwardly sunken at the outer circumferential surface of one end portion of the cylindrical door part 153 where the inside air intake hole 157 in order to control an intake amount of inside air inhaled into the inside air intake hole 157.

The recess part 155 is formed in such a way that the outer circumferential surface of the cylindrical door part 153 is sunken flatways, namely, in such a way that the outer circumferential surfaces of the door plates 153a and 153b of the cylindrical door part 153 are respectively sunken stepwise in the inward direction.

In this instance, the recess part 155 is not formed in the whole axial length section of the cylindrical door part 153 but is formed just from the end portion of the cylindrical door part 153 to a certain section.

As described above, because the stepwise recess part 155 is formed on the cylindrical door part 153, the air conditioner for the vehicle according to the present invention can adjust the intake amounts of the outside air inhaled to the outside air inflow port 142 and the inside air inhaled to the inside air intake ports 145 and 157 in the outside air inflow mode.

In other words, because opening areas of the inside air intake port 157 of the intake door 150 and the inside air intake port 145 of the intake duct 140 can be adjusted by the stepwise recess part 155, the air conditioner for the vehicle according to the present invention can adjust the intake amount of the inside air inhaled through the inside air intake ports 145 and 157, and finally, can adjust the intake amount of outside air through the outside air inflow port 142 and the intake amount of the inside air through the inside air intake ports 145 and 157 in the outside air inflow mode.

As an example, in the outside air inflow mode, the intake amount of outside air may be 70% and the intake amount of inside air may be 30%.

As described above, because there is no need to add components to inhale the inside air in the outside air inflow mode, the air conditioner for the vehicle according to the present invention can reduce manufacturing processes and manufacturing costs and enhance cooling and heating performance by inhaling some of the inside air in the outside air inflow mode.

In the meantime, preferably, the inside air intake port 157 of the intake door 150 is formed to be smaller than the inside air intake port 145 of the intake duct 140.

Furthermore, the intake door 150 is operated through operating means 170.

The operating means 170 includes: an arm 172 which is rotatably combined to the side of the intake duct 140 and has a pin (not shown) disposed at one end portion; and a cam 171 which is combined to a rotary shaft 151*b* of the intake door 150 and has a slot 171*a* for allowing the pin of the arm 172 to be combined slidably.

The operating means 170 actuates the arm 172 to operate the cam 171. That is, when the arm 172 rotates at a predetermined angle, the cam 171 is also rotated at a predetermined angle while the pin of the arm 172 moves along the slot 171*a* of the cam 171 so as to operate the intake door 150.

Meanwhile, the arm 172 may be operated by a wire (not shown) or an actuator (not shown), but is preferably, operated by the wire in this structure.

Figure 10:
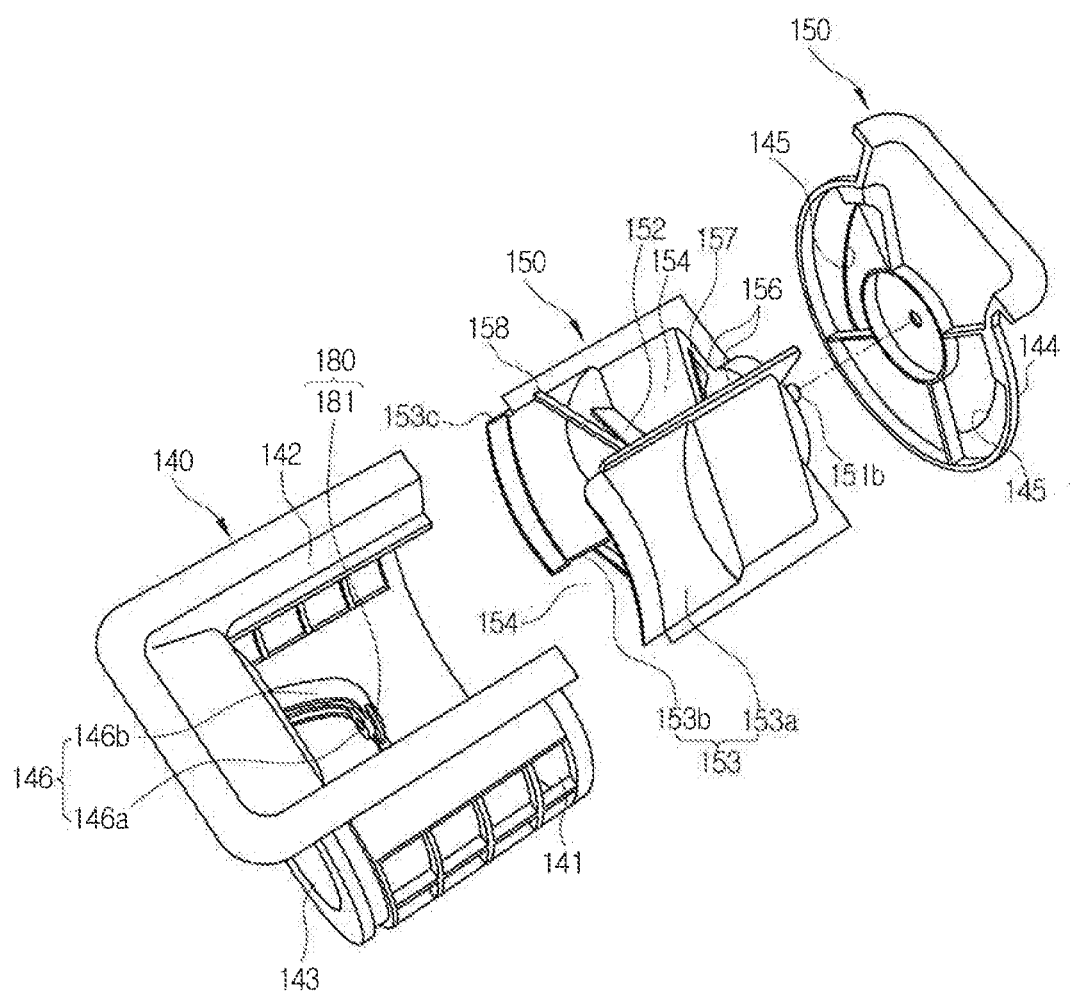
FIG. 10 is an exploded perspective view of the intake duct and the intake door on which misassembly preventing means is formed in the air conditioner for the vehicle according to the present invention.
Figure 11:
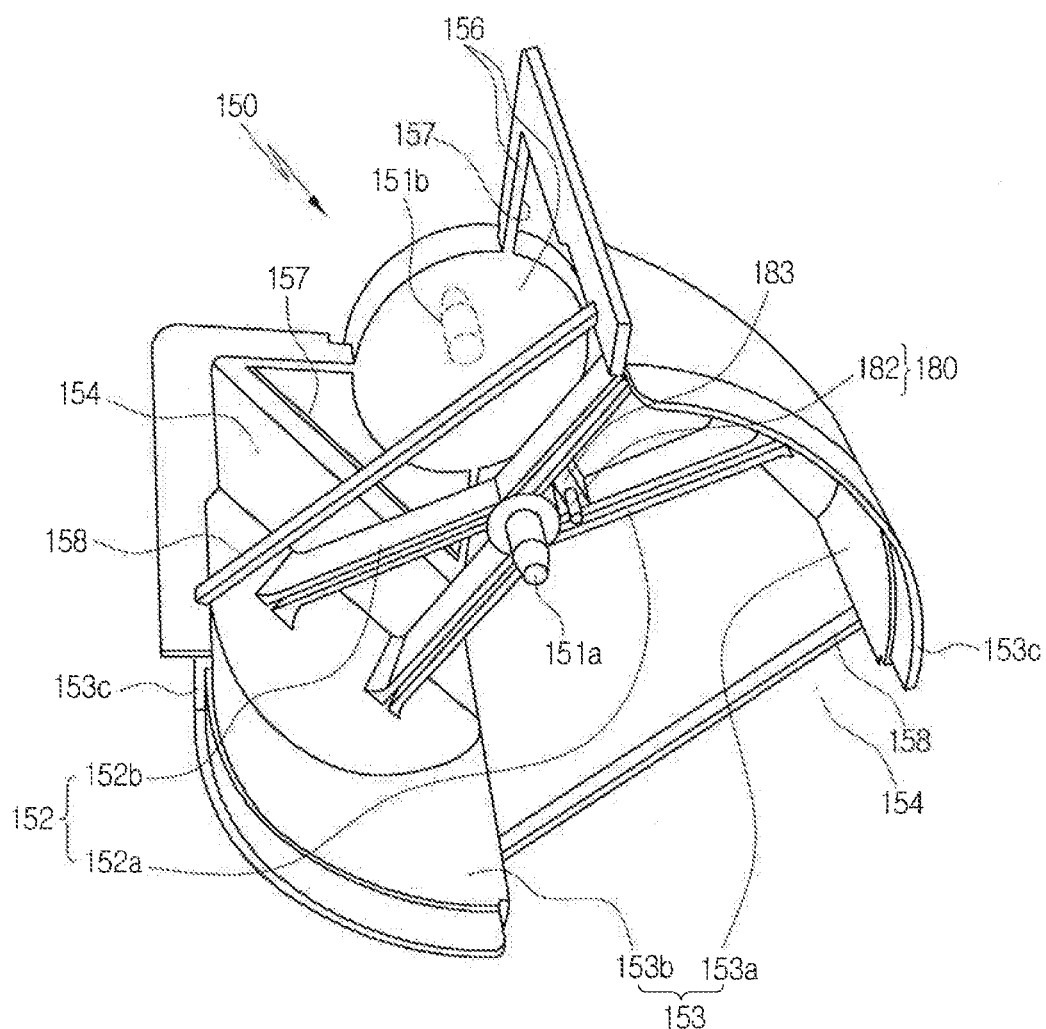
FIG. 11 is a perspective view of the intake door on which the misassembly preventing means is formed in the air conditioner for the vehicle according to the present invention.
Figure 12:
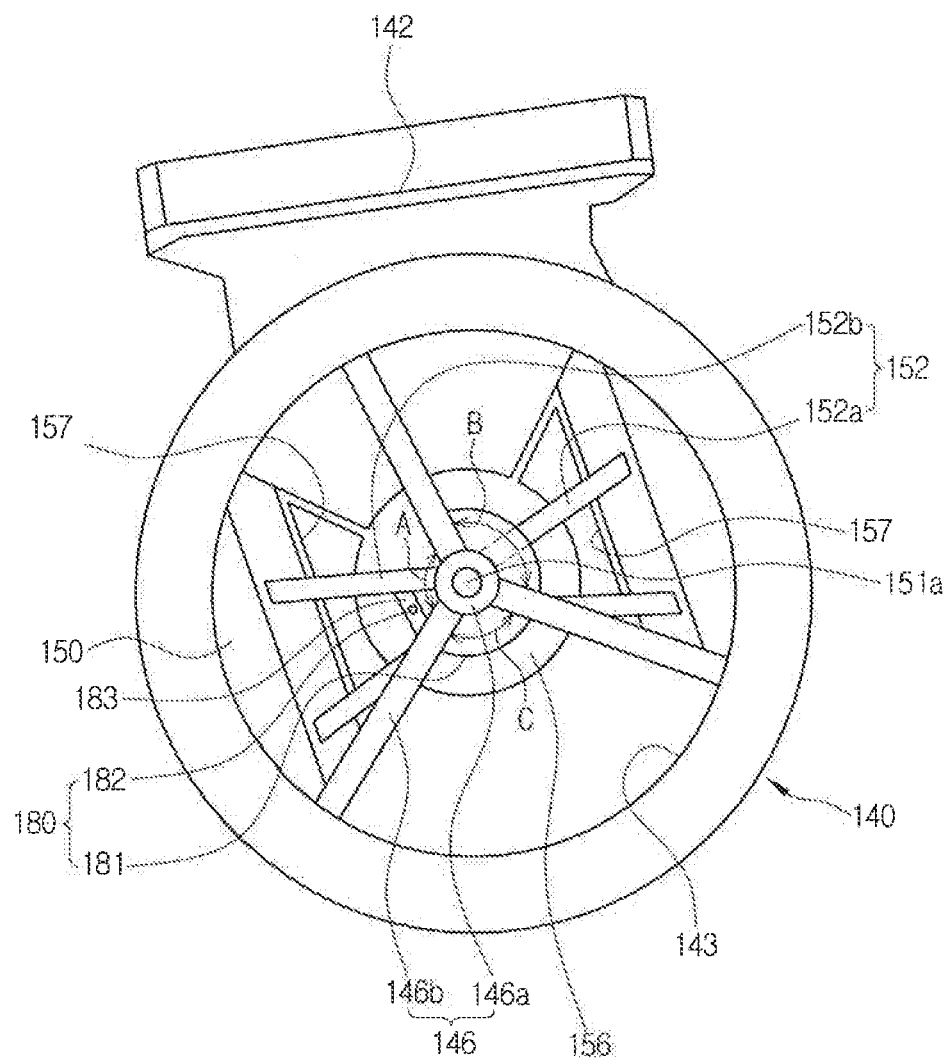
FIG. 12 is a side view seen from the opening of the intake duct in FIG. 10.
Figure 13:
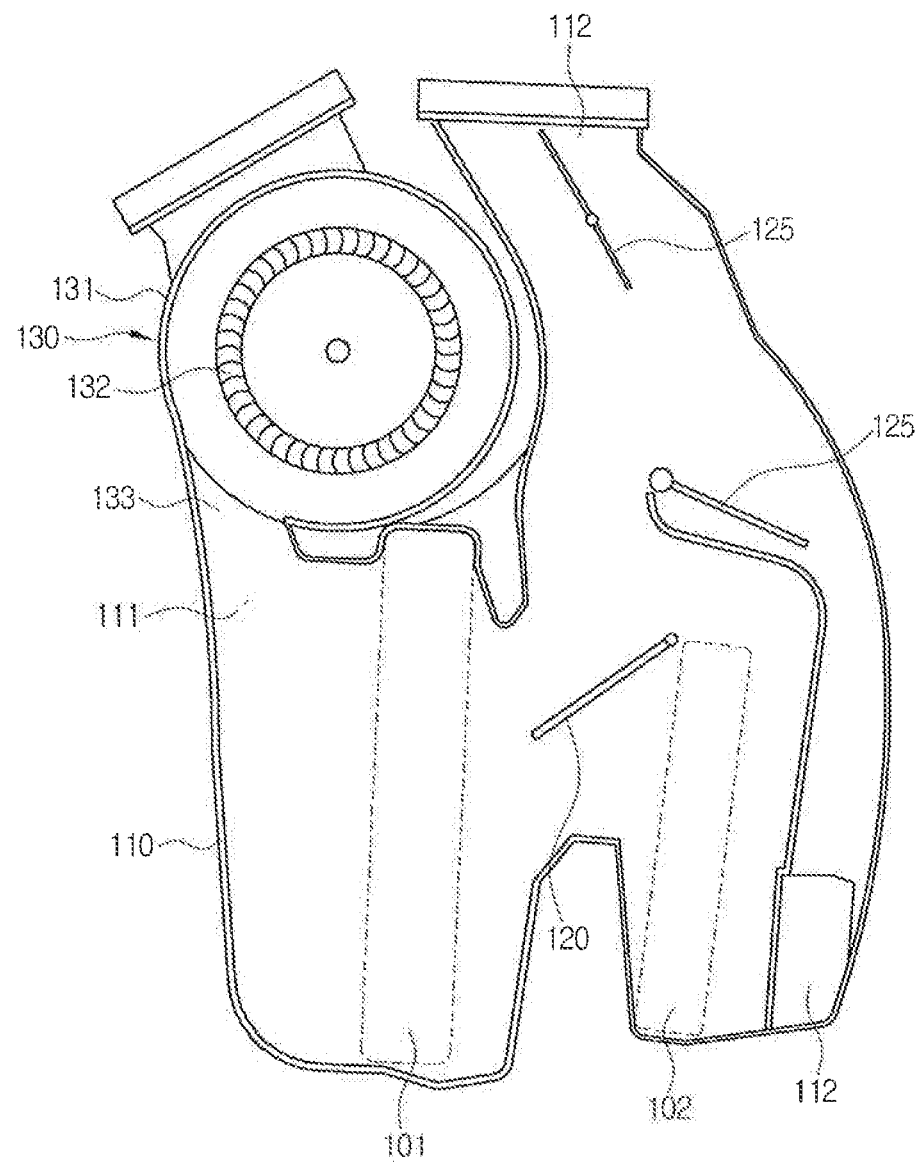
FIG. 13 is a sectional view showing the air conditioner for the vehicle according to the present invention.

FIG. 10 is an exploded perspective view of the intake duct and the intake door on which misassembly preventing means is formed in the air conditioner for the vehicle according to the present invention, FIG. 11 is a perspective view of the intake door on which the misassembly preventing means is formed in the air conditioner for the vehicle according to the present invention, and FIG. 12 is a side view seen from the opening of the intake duct in FIG. 10. Between the supporter 146 of the intake duct 140 and the support rib 152 of the intake door 150, misassembly preventing means 180 is formed to prevent misassembly between the intake door 150 and the intake duct 140.

The misassembly preventing means 180 includes: a stud 182 which protrudes on the support rib 152 in the axial direction and is arranged to be inserted into one area (A) of a plurality of areas (A, B and C) divided by a plurality of connection ribs 146*b* ; and a shielding plate 181 which is formed to connect the connection ribs 146*b* in the remaining areas (B and C) where the stud 182 is not inserted to prevent that the stud 182 is inserted into the remaining areas (B and C).

In other words, the stud 182 is inserted into one area (A) of the three areas (A, B and CO divided by the three connection ribs 146*b* and the shielding plate 181 is formed in the two remaining areas (B and C).

The area (A) where the stud 182 is inserted is an operation range of the intake door 150.

In the meantime, the shielding plate 181 is formed to connect the connection ribs 146*b* in the areas (B and CO where the stud 182 is not inserted, but is also connected to the outer circumferential surface of the boss part 146*a*.

Additionally, the stud 182 is formed on one of the first and second ribs 152*a* and 152*b* of the support rib 152. In the drawings, the stud 182 is formed on the second rib 152*b*.

In this instance, a reinforcing rib 183 for forming the stud 182 is formed inside the second rib 152*b* of a "V" form, and the stud 182 is formed on the side of the reinforcing rib 183 to protrude to a predetermined length in the axial direction.

Therefore, when the intake door 150 is rotated at a predetermined angle in order to open or close the inside and outside air inflow ports 141 and 142, the stud 182 is rotated within one area (A).

In this instance, when the intake door 150 opens the inside air inflow port 141, the stud 182 is caught to the connection ribs 146*b* located at one side of the area (A), but when the intake door 150 opens the outside air inflow port 142, the stud 182 is caught to the connection ribs 146*b* located at the other side of the area (A).

Therefore, because the stud 182 of the intake door 150 is caught to the connection ribs 146*b* of the supporter 146 within the operation range, the intake door 150 is prevented from being separated from the operation range by operating power or air volume of the actuator (not shown).

In other words, the stud 182 can improve the function to prevent the intake door 150 from being separated from the operation range.

In addition, when the intake door 150 is assembled inside the intake duct 140, because the stud 182 can be inserted into only one area (A) of the three areas (A, B and C) and cannot be inserted into the remaining areas (B and C) by the shielding plate 181, it prevents misassembly between the intake door 150 and the intake duct 140 and improve assemblability since the correct position of the intake door 150 can be found easily.

Moreover, preferably, a distance from the rotational center of the intake door 150 to the center of the stud 182 is shorter than a distance from the rotational center of the intake door 150 to the edge of the shielding plate 181. Therefore, the stud 182 is caught to the shielding plate 181 in the areas (B and CO where the shielding plate 181 is formed, and so, the stud 182 is not inserted into the areas (B and C).

Furthermore, preferably, the distance from the rotational center of the intake door 150 to the center of the stud 182 is shorter than half of the radius of the cylindrical door part 153.

That is, because the stud 182 is formed near to the boss part 146*a* of the supporter 146, it can improve bearing strength of the connection ribs 146*b* of the supporter 146 more than a case that the stud 182 is formed far from the boss part 146*a*.

In other words, when the intake door 150 is operated, the stud 182 comes into contact with the connection ribs 146*b*, and in this instance, a predetermined power is applied to the stud 182, which gets in contact with the connection ribs 146*b*, by operating power of the actuator or air volume. In this instance, when the stud 182 is formed near to the boss part 146a, bearing strength of the connection ribs 146*b* against pushing power of the stud 182 can be increased.

Additionally, the bearing power of the connection rib 146 can be also improved by the shielding plate 181 which connects a plurality of the connection ribs 146*b*.

As described above, when the intake door 150 is assembled, the structure of the stud 182 and the shielding plate 181 can prevent that the stud 182 is not assembled to the correct position, where the shielding plate is not formed, but is assembled to another position, where the shielding plate is formed, can prevent separation of the intake door 150, and can enhance bearing strength of the connection ribs 146*b*.

Hereinafter, actions of the air conditioner for the vehicle according to the present invention will be described. First, when the centrifugal fan 132 is operated by operation of the motor 132*a*, low pressure is formed inside the centrifugal fan 132 by the rotation of the centrifugal fan 132, so that inside air or outside air is inhaled into the intake duct 140 through the inside air inflow port 141 or the outside air inflow port 142 opened by the intake door 150. The inhaled air passes the inside of the intake door 150, flows to the inside of the centrifugal fan 132, and then, is blown in the radial direction of the centrifugal fan 132.

Here, in the inside air inflow mode, the intake door 150 closes the outside air inflow port 142 but opens the inside air inflow port 141 and opens the inside air intake hole 145 of the intake duct 140, so that just the inside air flows in through the inside air inflow port 141 and the inside air intake hole 145.

In the outside air inflow mode, the intake door 150 closes the inside air inflow port 141 but opens the outside air inflow port 142, and the inside air intake hole 145 of the intake duct 140 and the inside air intake hole 157 of the intake door 150 are also opened, so that outside air is induced through the outside air inflow port 142 and the inside air is also induced through the inside air intake holes 145 and 157. In this instance, the outside air is inhaled at the rate of about 70% and the inside air is inhaled at the rate of about 30%.

Continuously, the air blown in the radial direction of the centrifugal fan 132 is blown to the inside of the air-conditioning case 110 while moving along the inside of the scroll case 131.

The air blown to the inside of the air-conditioning case 110 is selectively cooled while passing the evaporator 101 according to heating or cooling modes, and then, flows in a cold air state by bypassing the heater core 102 by the temperature-adjusting door 120 or flows in a warm air state while passing through the heater core 102.

The air changed into warm air or cold air is discharged to the interior of the vehicle through the outlet 112 opened through the mode door 125 so as to cool or heat the interior of the vehicle.

The invention claimed is:

1. An air conditioner for a vehicle comprising:
a scroll case which is disposed at an inlet of an air-conditioning case and has a centrifugal fan mounted therein;
an intake duct which is combined to one side of the scroll case in an axial direction of the centrifugal fan and has inside air inflow ports and an outside air inflow port to introduce inside air and outside air; and
an intake door which is rotatably mounted inside the intake duct through a rotary shaft to open and close the inside air inflow ports and the outside air inflow port,
wherein an opening of the intake duct is combined at one side of the scroll case and the inside air inflow ports and the outside air inflow port are formed in the outer circumferential surface of the intake duct to be spaced apart from each other in the circumferential direction,
wherein the intake door has a hollow cylindrical door part formed as an opening to open and close the inside air inflow ports and the outside air inflow port according to rotational angles, and
wherein a first inside air intake hole is formed in a side of the intake duct and a second inside air intake hole is formed in a side of the intake door, and
wherein in the outside air inflow mode the outside air inflow port is opened by the intake door, inside air existing outside the intake duct is inhaled into the intake door when the first inside air intake hole and the second inside air intake hole overlap with each other.

2. The air conditioner according to claim 1, wherein a recess part is formed on the cylindrical door part to be inwardly sunken at the outer circumferential surface of the cylindrical door part in order to control intake amounts of inside air and outside air in the outside air inflow mode.

3. The air conditioner according to claim 2, wherein the second inside air intake hole is smaller than the first inside air intake port of the intake duct.

4. The air conditioner according to claim 2, wherein the recess part is formed in such a way that the outer circumferential surface of the cylindrical door part is sunken flatways.

5. The air conditioner according to claim 1, wherein:
a supporter for rotatably supporting a rotary shaft of the intake door is disposed on an inner circumferential surface of the intake duct,
the supporter comprises a boss part for rotatably supporting the rotary shaft of the intake door, and a plurality of connection ribs for connecting the boss part with the inner circumferential surface of the intake duct, and
the rotary shaft of the intake door is rotatably combined to the supporter.

6. The air conditioner according to claim 5, wherein the intake door comprises:
a pair of door plates which are spaced apart from each other at a predetermined interval in the radial direction based on the rotary shafts of the intake door to form the cylindrical door part; a support rib which connects inner faces of the door plates with each other and on which the rotary shaft of the intake door is formed; and a side plate which connects one end portion of each of the door plates with each other and on which the rotary shaft of the second side is formed.

7. The air conditioner according to claim 6, wherein an inside air intake hole of the intake door is formed in the side plate to penetrate the side plate, and
wherein the inside air intake hole of the intake duct is formed in the side of the intake duct opposed to the side plate of the intake door to penetrate the side of the intake duct.

8. The air conditioner according to claim 6, wherein the intake duct comprises:
an insertion groove formed on a circumference of the opening of the intake duct; and
a support protrusion formed on a plurality of end portions of the door plates to be rotatably supported and inserted into the insertion groove.

9. The air conditioner according to claim 8, wherein if the depth of the insertion groove is "a" and the length of the support protrusion inserted into the insertion groove is "b", a ratio of b/a satisfies 0.6 to 0.8.

10. The air conditioner according to claim 8, wherein if the width of the insertion groove is "c" and the thickness of the support protrusion inserted into the insertion groove is "d", a ratio of d/c satisfies 0.65 to 0.75.

11. The air conditioner according to claim 6, wherein a pair of the inside air inflow ports of the intake duct are formed corresponding to the positions of a pair of the door plates, and a single outside air inflow port is formed between the inside air inflow ports.

12. The air conditioner according to claim 5, wherein the intake door is mounted such that the rotary shafts of the intake door are arranged in the same direction as the rotary shaft of the centrifugal fan.

13. The air conditioner according to claim 5, wherein a support rib is formed on the inner circumferential surface of the cylindrical door part to fix and support the rotary shaft, and
wherein misassembly preventing means is formed on the supporter and the support rib in order to prevent misassembly between the intake door and the intake duct.

14. The air conditioner according to claim 13, wherein the misassembly preventing means comprises:
a stud which protrudes on the support rib in an axial direction, in line with the axis of the rotary shafts and is arranged to be inserted into a one area (A) of a plurality of areas (A, B, C) divided by a plurality of connection ribs; and
a shielding plate which is formed to connect the connection ribs in the remaining areas (B, C) where the stud is not inserted to prevent that the stud is inserted into the remaining areas (B, C).

15. The air conditioner according to claim 14, wherein the plural connection ribs are formed at an interval of 120 degrees, and
wherein the stud is arranged to be inserted into the one area (A) of the plurality of areas (A, B, C) divided by the three connection ribs, and the shielding plate is formed in the two remaining areas (B, C).

16. The air conditioner according to claim 14, wherein a distance from a rotational center of the intake door to the center of the stud is shorter than a distance from the rotational center of the intake door to the edge of the shielding plate.

17. The air conditioner according to claim 16, wherein the distance from the rotational center of the intake door to the center of the stud is shorter than half of the radius of the cylindrical door part.

\* \* \* \* \*